United States Patent
Ritti et al.

(10) Patent No.: US 9,302,946 B2
(45) Date of Patent: Apr. 5, 2016

(54) PROCESS FOR PRODUCING A CERAMIC MATRIX COMPOSITE PART

(75) Inventors: Marie-Hélène Ritti, Chatenay Malabry (FR); Bertrand Laine, Le Taillan Medoc (FR); Michel Parlier, Voisins le Bretonneux (FR); Aurélie Julian-Jankowiak, Limours (FR)

(73) Assignee: OFFICE NATIONAL D'ETUDES ET DE RECHERCHES AEROSPATIALES (ONERA), Chatillon (FR)

( * ) Notice: Subject to any disclaimer, the term of this patent is extended or adjusted under 35 U.S.C. 154(b) by 604 days.

(21) Appl. No.: 13/642,108

(22) PCT Filed: Apr. 18, 2011

(86) PCT No.: PCT/FR2011/000230
§ 371 (c)(1),
(2), (4) Date: Dec. 19, 2012

(87) PCT Pub. No.: WO2011/131857
PCT Pub. Date: Oct. 27, 2011

(65) Prior Publication Data
US 2013/0116109 A1    May 9, 2013

(30) Foreign Application Priority Data
Apr. 20, 2010 (FR) ..................................... 10 01664

(51) Int. Cl.
*C04B 35/80* (2006.01)
*C04B 35/622* (2006.01)
(Continued)

(52) U.S. Cl.
CPC ......... *C04B 35/62222* (2013.01); *C04B 35/117* (2013.01); *C04B 35/14* (2013.01);
(Continued)

(58) Field of Classification Search
CPC   C04B 35/80; C04B 35/803; C04B 2235/616; C04B 2235/5256; C04B 35/806
See application file for complete search history.

(56) References Cited

U.S. PATENT DOCUMENTS

| | | | |
|---|---|---|---|
| 5,306,554 | A | 4/1994 | Harrison et al. |
| 5,569,422 | A | 10/1996 | Astier et al. |

(Continued)

FOREIGN PATENT DOCUMENTS

| | | |
|---|---|---|
| EP | 0 656 329 A1 | 6/1995 |
| EP | 0 656 329 B1 | 6/1995 |

(Continued)

OTHER PUBLICATIONS

Yang, et al., "Processing of Oxide Composites with Three-Dimensional Fiber Architectures," Journal of the American Ceramic Society, 2009, pp. 1087-1092, vol. 92, No. 5, Santa Barbara, California.

(Continued)

*Primary Examiner* — Erin Snelting
(74) *Attorney, Agent, or Firm* — Lewis Roca Rothgerber Christie LLP

(57) ABSTRACT

The invention relates to a process for producing a ceramic matrix composite (CMC) part by infiltration of a suspension (S) of a ceramic powder into a fibrous reinforcement (14). A suspension (S) of ceramic powder containing particles of chosen particle size, dispersed in at least one solvent, is prepared. The infiltration of the suspension is carried out in a single step in the fibrous reinforcement (14) positioned between a mold (12) and a permeable membrane (16), which makes it possible to apply a vacuum (V) and to subsequently remove the solvent from the suspension through the permeable membrane (16). The invention applies to the production of large-sized parts of complex shape, in particular in the field of aeronautics and aerospace engineering.

14 Claims, 2 Drawing Sheets

(51) Int. Cl.
*C04B 35/117* (2006.01)
*C04B 35/14* (2006.01)
*C04B 35/185* (2006.01)
*C04B 35/488* (2006.01)
*C04B 35/628* (2006.01)

(52) U.S. Cl.
CPC ............ *C04B 35/185* (2013.01); *C04B 35/488* (2013.01); *C04B 35/62865* (2013.01); *C04B 35/62873* (2013.01); *C04B 35/80* (2013.01); *C04B 35/803* (2013.01); *C04B 2235/522* (2013.01); *C04B 2235/5224* (2013.01); *C04B 2235/5228* (2013.01); *C04B 2235/5244* (2013.01); *C04B 2235/5248* (2013.01); *C04B 2235/5252* (2013.01); *C04B 2235/5256* (2013.01); *C04B 2235/616* (2013.01)

(56) References Cited

U.S. PATENT DOCUMENTS

| | | | |
|---|---|---|---|
| 2002/0197467 | A1 | 12/2002 | Johnson |
| 2006/0081323 | A1* | 4/2006 | Millard et al. ............ 156/89.11 |
| 2006/0280940 | A1* | 12/2006 | Kanka .......................... 428/364 |
| 2010/0005780 | A1 | 1/2010 | Philippe et al. |
| 2013/0122763 | A1* | 5/2013 | Fish et al. ....................... 442/59 |

FOREIGN PATENT DOCUMENTS

| | | |
|---|---|---|
| EP | 1 281 697 A1 | 2/2003 |
| EP | 1 647 537 A1 | 4/2006 |
| FR | 2 526 785 | 11/1983 |
| FR | 2 912 469 | 8/2008 |

OTHER PUBLICATIONS

Moore, E. H., et al., "3-D Composite Fabrication Through Matrix Slurry Pressure Infiltration," XP-002609140, Ceramic Engineering & Science Proceedings, 1994, pp. 113-120, Dayton Ohio.

Sim, S.-M., et al., "Slurry Infiltration of 3-D Woven Composites," XP-002609141, Ceramic Engineering & Science Proceedings, 1992, pp. 632-641, Ohio.

Naskar, M. K., et al., "Sol-gel approach to near-net-shape oxide—oxide composites reinforced with short alumina fibres—The effect of crystallization," ScienceDirect, Ceramics International 35, 2009, pp. 3073-3079.

International Search Report for International Application No. PCT/FR2011/000230, date of mailing Aug. 4, 2011, 8 sheets.

* cited by examiner

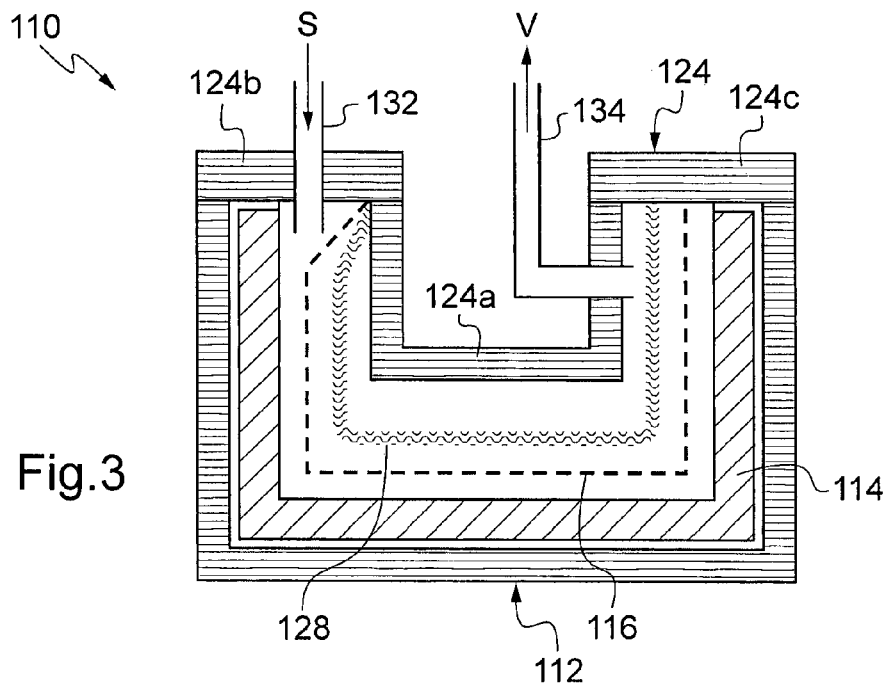
Fig.3
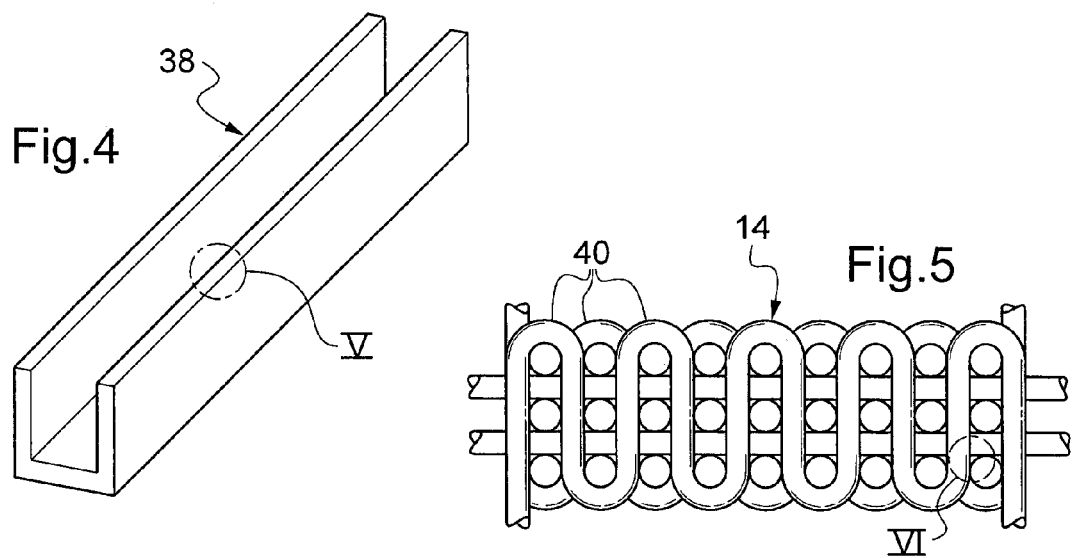
Fig.4
Fig.5
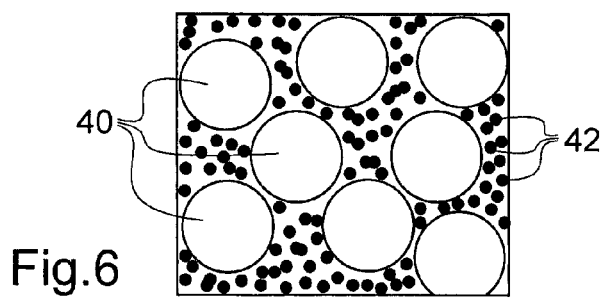
Fig.6

PROCESS FOR PRODUCING A CERAMIC MATRIX COMPOSITE PART

CROSS-REFERENCE TO RELATED APPLICATION(S)

This application is a National Phase Patent Application and claims priority to and benefit of International Application Number PCT/FR2011/000230, filed on Apr. 18, 2011, which claims priority to and benefit of French Patent Application Number 10/01664, filed on Apr. 20, 2010, the entire disclosure of which are incorporated herein by reference.

The invention relates to the field of Ceramic Matrix Composites (abbreviated as CMCs).

It relates more particularly to a process for producing a ceramic matrix composite part by infiltration of a suspension of a ceramic powder into a fibre reinforcement, and to the composite part so obtained.

Ceramic matrix composites are emerging materials which have a high level of thermomechanical properties and can be used under severe operating conditions, such as temperatures higher than 750° C. or corrosive environments.

In view of their high level of thermomechanical performance, these materials are used in particular in the production of mechanical parts, for example in the aeronautics or aerospace field, for engine parts, etc.

The production of ceramic matrix composite parts presents various problems.

Firstly, because ceramics are fragile materials, perfect control of fibre/matrix cohesion is necessary in order to avoid premature rupture of the material by rupture of the fibres when cracks in the ceramics matrix propagate. To that end, it is necessary to limit fibre/matrix bonding by introducing porosity into the matrix or a fibre/matrix interphase (for example carbon).

Apart from the nature of the fibres, two other important parameters for the mechanical properties are (i) the fibre content by volume and (ii) the nature of the matrix, the first parameter being highly dependent upon the production process.

Several processes which allow this type of composite to be produced are already known, such as vacuum-pressure infiltration or prepreg moulding in a plastic bag using a suspension.

A suspension is composed of particles in suspension in a liquid carrier phase. However, the liquid phase can also act as solvent for organic additions or for liquid ceramic precursors. For that reason, and in order to simplify the nomenclature, the liquid carrier phase is here called the "solvent".

A process of vacuum-pressure infiltration (or submicron powder aspiration SPA) for the production of CMCs has already been developed by the applicants (see FR 2 526 785 and EP 0 656 329). In this known process, a fibre reinforcement is placed on a filter, a ceramic suspension in an aqueous medium is poured onto the upper surface of the reinforcement, pressure is applied to the free surface of the suspension in order to cause it to penetrate the reinforcement, and a vacuum is created beneath the lower face of the filter in order to remove the water in liquid form. This technique has the advantage of producing the CMCs in a single step while limiting gaseous inclusions, but a fibre content by volume of greater than 40% is difficult to achieve in practice for stacks of fabrics. In addition, this known process does not allow parts of complex shapes and large dimensions to be produced.

More recently, a process for moulding prepregs in a plastic bag has been developed in order to increase the fibre content by volume and thus the mechanical properties of the materials (see publications U.S. Pat. No. 5,569,422, EP 1 281 697 and US 2002/0197467). After impregnation of a fibre fabric by various known methods (strip casting, impregnation, etc.) with a ceramic suspension, the plies of the fabric are partially dried and then stacked on a tool or mould and pressed under a vacuum with temperature control. Vacuum pressing at temperature allows the solvent to be removed in the form of vapour.

This technique allows more complex parts to be produced than by vacuum-pressure infiltration, with fibre contents by volume greater than 40% and sometimes even of 50% by volume. However, this known technique requires a prior step of preimpregnation of the plies of the fibre reinforcement, which makes the process more complicated to carry out.

It is an object of the invention especially to overcome the disadvantages of the known processes.

The invention aims especially to produce ceramic matrix composite parts of large size and of complex shape in a single infiltration step, while retaining sufficient mechanical properties for the intended use.

The expression "parts of large size" is intended to denote parts, especially in the aeronautics or aerospace field, which can reach dimensions of several metres.

The invention aims also to produce such a mechanical part, in a single step, with a controlled fibre content by volume which can reach 60%.

In a first aspect, the invention relates to a process for producing a ceramic matrix composite (CMC) part by infiltration of a suspension of a ceramic powder into a fibre reinforcement.

The process of the invention comprises the following steps:
a) preparing a suspension of ceramic powder containing particles of chosen particle size dispersed in at least one solvent;
b) positioning a fibre reinforcement in a mould;
c) positioning a permeable membrane of chosen permeability on the fibre reinforcement;
d) positioning an impermeable membrane, which forms a counter-mould;
e) establishing a vacuum between the impermeable membrane and the permeable membrane;
f) injecting the suspension of ceramic powder of step a) into the fibre reinforcement;
g) removing the solvent through the permeable membrane in order to obtain an infiltrated preform;
h) removing the infiltrated preform obtained in step g) from the mould; and
i) sintering the infiltrated preform obtained in step h).

This process, in a single step, allows a suspension of a ceramic powder to be infiltrated into a fibre reinforcement in order to produce parts which can be of large size and of complex shape with a fibre content by volume which can easily be controlled and can reach 60% or even more.

In the process of the invention, the ceramic powder is introduced by means of a difference of pressure into the fibre reinforcement in the form of a suspension, which requires the subsequent removal of the solvent. A multiphase suspension (solid phase+liquid phase) is used here and, accordingly, the capillarity forces within the fibre reinforcement can result in a speed of displacement of the liquid phase which is higher than that of the solid phase.

CMCs had never been produced by infiltration of a ceramic suspension with such high fibre contents by volume (greater than 60%), and a fortiori in a single step. Such an infusion/infiltration process had not been carried out within the context of CMCs because it requires perfect control of the particle size of the powders, as well as of the homogeneity and viscosity of the suspension. This process requires the use of powders of controlled particle size, in particular of very fine particle size (typically less than 1 μm), or even colloidal (typically less than 220 nm) with quite high loading rates of the suspension (which can be greater than 50% by volume).

Another important feature of the process of the invention is the positioning of a permeable membrane or layer, which makes it possible to retain only the desired elements (ceramic powder and optionally a ceramic precursor) and which subsequently allows the solvent to be removed.

Accordingly, the process of the invention is based especially on three essential features, namely the use of a ceramic powder of chosen particle size, the infiltration of the suspension by means of a difference of pressure, and the presence of the permeable membrane through which the solvent is removed from the ceramic matrix.

In particular, the process of the invention allows CMCs to be produced starting from fibre reinforcements of large thickness, typically from 5 to 50 mm, such as, for example, thick 3D (three-dimensional) fibre reinforcements, which was not possible with the processes of the prior art.

The suspension of ceramic powder prepared in step a) advantageously comprises at least one ceramic powder, at least one solvent and optionally at least one ceramic precursor.

There can be used as the ceramic powder in particular materials of the carbide, nitride, boride or oxide type, with preference being given to alumina.

There is used as the solvent especially water or organic media, such as, for example, alcohols, alkanes, etc.

There come into consideration for the precursor in particular materials of the type zirconia, mullite, alumina or silica or a mixture thereof.

The particle size of the particles is chosen in dependence upon the characteristic voids of the fibre reinforcement.

Accordingly, when the fibre reinforcement is composed of fibres that delimit voids of a size of a given value, the ceramic powder is composed of particles having a diameter which is from 5 to 10 times smaller than the size of the voids. The particle size is preferably less than 0.5 μm.

It is also possible, by way of variation, to use ceramic powders of at least two different particle sizes. As an example, it is possible to use particle diameters which are from 5 to 10 times smaller than the size of the above-mentioned voids and particle diameters which are from 50 to 100 times smaller than the size of the above-mentioned voids.

The loading rate of the suspension can reach 50% by volume and can be adjusted in dependence upon the fibre content by volume and the fixed porosity.

Dispersion of the particles can be carried out by controlling the pH in aqueous medium or by adding a dispersing agent in an organic and aqueous medium. Powders of different particle sizes and of different kinds can be mixed in dependence upon the nature and function of the composite.

As indicated, it is possible to add one or more ceramic precursors, for example liquid precursors, to the ceramic suspension, within the limit of their solubility. The purpose thereof is to impart particular properties to the materials, to lower the heat treatment temperature or to improve infiltration.

Other organic additions can be used, such as a binder and/or a plasticiser and/or a wetting agent and/or an antifoam, in order to impart better mechanical strength and better flexibility to the composites prior to heat treatment.

Examples of binders and plasticisers which may be mentioned are products from the group of the polyvinyl alcohols (PVA), methyl methacrylates, in particular polymethyl methacrylates (PMMA), and polyethylene glycols (PEG), in particular of low density.

The wetting agent can be, for example, an ammonium polymethacrylate.

The antifoam can be composed of derivatives of fatty acid and of hydrocarbons.

The suspension is homogenized by conventional techniques, for example planetary grinding, attrition, etc.

For the fibres of the fibre reinforcement there can advantageously be used silicon carbide (SiC), carbon (C) or oxide fibres. However, composites with oxide fibres and a nitride, carbide or boride matrix do not at present appear possible owing to the fact that the sintering temperatures of such matrices are too high for the oxide fibres.

The fibres are generally coated with a size so that they can be handled and woven more easily.

Oxide fibres can be of different kinds and are generally supplied by 3M under the names Nextel® 610, Nextel® 720, Nextel® 650, Nextel® 312, Nextel® 550 or Nextel® 440, for example.

Examples of silicon carbide fibres are fibres supplied under the trade marks Tyranno®, Sylmaric®, Nicalon®, etc.

Examples of carbon fibres are fibres marketed under the trade marks Novoltex® or Naxeco®.

The fibres can be used in the form of reinforcements which are woven (2D; 2.5D; 3D), braided (2D, 3D), knitted, laid up in the form of felts or of multiaxial reinforcements based on stitched unidirectional fabrics. Such reinforcements can be preformed to produce parts of complex geometry.

In the process of the invention, step a) of preparing the suspension and step b) of positioning the fibre reinforcement can be carried out in succession or optionally in parallel.

The fibre reinforcement positioned in step b) is composed of plies which are arranged in a mould of desired shape, the term "mould" generally denoting any suitable support (for example a tool) for receiving the fibre reinforcement.

The fibre reinforcement can optionally be wetted beforehand.

The process can further comprise a step of de-sizing the fibre reinforcement, which step can be carried out before and/or during the injection step f), by thermal or chemical action, for example by dissolving the size in the solvent.

An interphase, for example carbon or boron nitride, can be deposited on the fibre reinforcement prior to the injection step f).

In step c), a permeable membrane (membrane or filter) of chosen permeability, that is to say that is permeable to gases and/or to liquids, is positioned. Step c) thus allows a first cavity containing the fibre reinforcement to be closed.

In step d) there is positioned an impermeable membrane (that is to say a membrane that is impermeable to gases, liquids and solids) which forms a counter-mould in order to ensure that the whole is tight and to delimit a second cavity.

Step d) thus forms a second tight cavity, which is next to the first cavity and contains the first cavity.

The mould and the impermeable membrane forming the counter-mould together delimit a moulding cavity of chosen shape corresponding to the shape of the part to be produced. It can either be a moulding cavity of fixed volume (rigid counter-mould) or a moulding cavity of variable volume (flexible or semi-rigid counter-mould).

Release and/or drainage fabrics can be added to the plies of the fibre reinforcement and above the permeable membrane in order to facilitate evacuation of the fluids.

In step e), a vacuum is created between the impermeable membrane and the permeable membrane.

Preferably, a vacuum is generated in the second cavity, which creates a vacuum in the first cavity and in the first instance allows the suspension to be infiltrated or infused into the fibre reinforcement by injecting it beneath the permeable membrane. The solvent is then removed in gaseous and/or liquid form through the same permeable membrane (step g).

In the case of a process with variable volume, the ceramic suspension is infused beneath the permeable membrane by means of low pressure with the possibility of adding pressure to the suspension.

In addition, the fibre content by volume is fixed by the thickness of the plies and can be adjusted by application of an external pressure to the plies (autoclave or press, for example).

That pressure, when it is applied during or after the injection/infusion, can contribute towards the successful impregnation of the fibre reinforcement.

In the case of a process with constant volume, the fibre content by volume is fixed by the frame of the mould, and the suspension can be infiltrated either by generating a vacuum or by applying a pressure to the suspension, or by combining the two. The suspension is then infiltrated in a single step into the totality of the fibre reinforcement and not, as in the prior art, ply by ply or in several infiltration operations.

In order to facilitate removal of the solvent, the composite can be covered completely in a permeable membrane and then an impermeable membrane, which allows the gases and liquids to be removed on both sides of the composite. The vacuum is then created at several locations beneath the impermeable membrane. Likewise, it is possible to inject the suspension at several locations in order to facilitate infiltration.

The porosity of the material is controlled by the fibre content by volume as well as by the loading rate by volume of the infiltrated suspension.

The parameters vacuum/pressure are adjusted in dependence upon the viscosity of the suspension, and removal of the solvent can be assisted by the application of heat.

After removal of the solvent and drying of the composites, the latter are removed from the mould (step g) and then sintered (step h).

Sintering (or consolidation) is carried out at a temperature adapted to the fibres and particles used, and generally under a controlled pressure and atmosphere (air, argon, vacuum, etc.).

Finally, in another aspect, the invention relates to a ceramic matrix composite part such as can be obtained by carrying out the process defined above.

In the following description, which is given solely by way of example, reference is made to the accompanying drawings, in which:

FIG. 3 is a schematic representation of a moulding device of constant volume for the manufacture of a part having a generally U-shaped cross-section;

FIG. 4 is a perspective view of the moulded part obtained with the device of FIG. 3;

FIG. 5 shows the detail V of FIG. 4, on an enlarged scale, in order to illustrate the plies of the fibre reinforcement; and FIG. 6 shows the detail VI of FIG. 5, on an enlarged scale.

Figure 1:
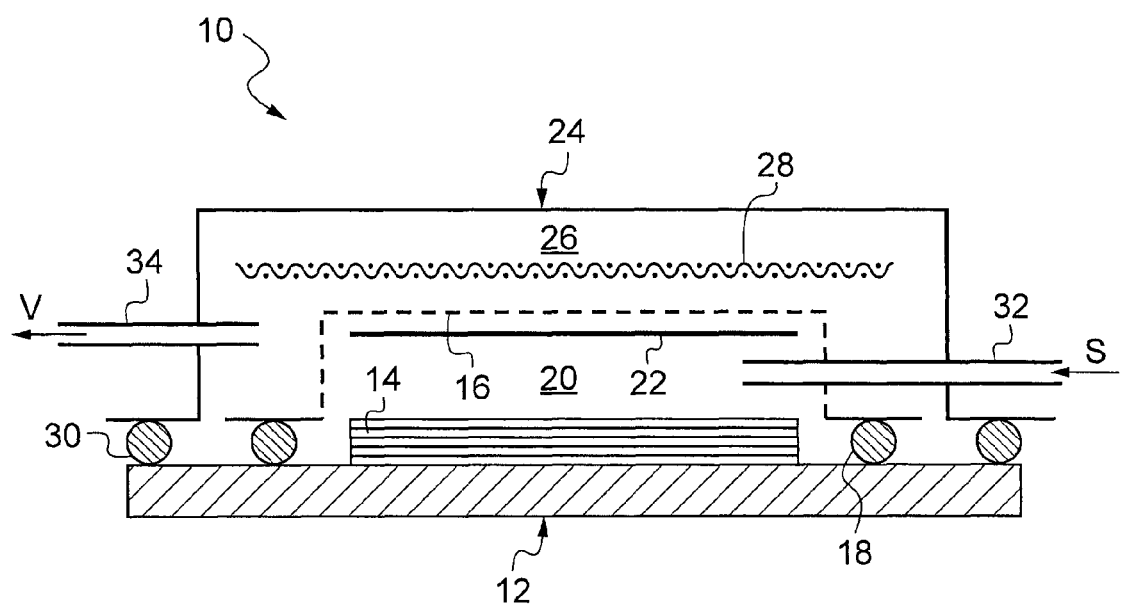
FIG. 1 shows schematically a moulding device of variable volume for carrying out the process of the invention.

The moulding device 10 shown in FIG. 1 comprises a mould 12, here a mould bottom, of impermeable structure. On the mould bottom there is positioned a fibre reinforcement 14 in the form of plies of a fibre fabric as defined above.

A permeable membrane 16 is then positioned above the fibre reinforcement 14 with the interposition of a seal 18 between the membrane and the mould 12. There is thus delimited, between the mould 12 and the membrane 16, a first cavity 20 which contains the fibre reinforcement 14. A release fabric 22, optionally coupled with a drainage fabric, is further placed above the fibre reinforcement 14 inside the cavity 20.

An impermeable membrane or layer 24 is positioned above the permeable membrane 16 and contributes to forming a second cavity 26 which is next to the first cavity and contains the first cavity. The impermeable membrane 24 forms a counter-mould which, in combination with the mould 12, will give the desired shape to the part that is to be manufactured. The counter-mould is here of flexible or semi-rigid structure in order to allow a process of variable volume to be carried out.

A drainage fabric 28 is placed in the second cavity 26, and above the permeable membrane 16.

A seal 30 ensures tightness between the impermeable membrane 24, which forms the counter-mould, and the mould 12.

An injection conduit 32 passes through the impermeable membrane 24 in a tight manner and opens into the first cavity 20. This conduit is used for injecting the suspension of ceramic powder (arrow S) into the fibre reinforcement 14.

In addition, an aspiration conduit 34 passes through the membrane 34 in a tight manner and opens into the second cavity 26. This conduit allows a vacuum (arrow V) to be created between the impermeable membrane 24 and the permeable membrane 16.

The device 10 of FIG. 1 is shown schematically and, in practice, can be produced in different shapes so that the mould 12 and the impermeable membrane 24 contribute to delimiting together a moulding cavity corresponding to the geometric shape of the part to be produced.

It is possible to provide one or more injection conduits 32 at chosen locations and, likewise, one or more aspiration conduits 34 at chosen locations.

Figure 2:
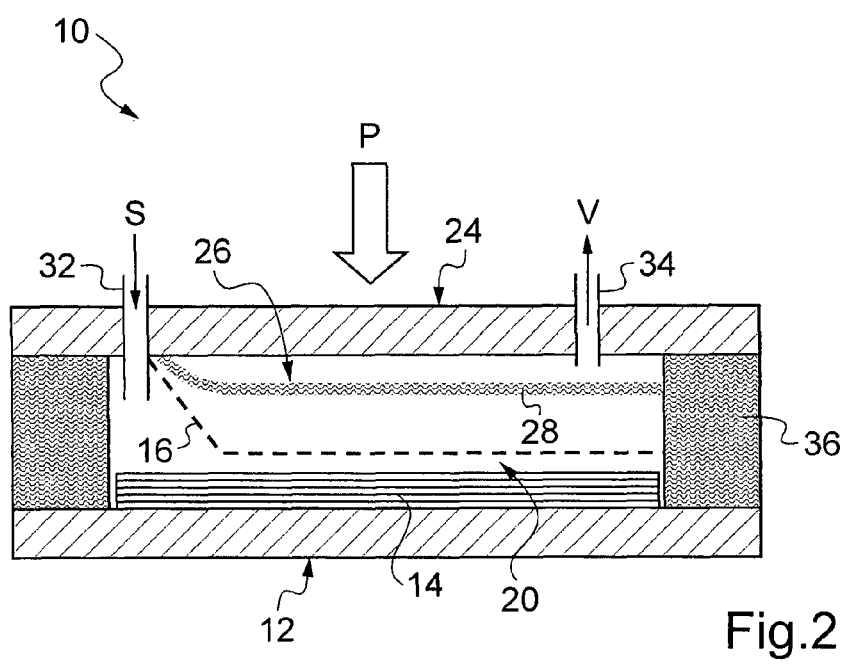
FIG. 2 is a schematic sectional view of another moulding device of variable volume.

FIG. 2 shows a device analogous to that of FIG. 1 which likewise permits a process of variable volume. The impermeable membrane 24 here rests on at least one deformable and impermeable block 36, for example a peripheral block, which in turn rests on the mould 12. The injection conduit 32 and the aspiration conduit 34 both pass through the impermeable membrane 24, which forms a type of generally flat cover resting on the block 36.

External pressure (arrow P) can be applied to the impermeable membrane 24 in the direction of the mould 12, which allows the block 36 to be deformed and compressed. For the rest, the other elements are denoted by the same reference numerals as in FIG. 1. In this embodiment, the release fabric 22 optionally coupled to a drainage fabric 22 of FIG. 1 has been omitted.

In the embodiment of FIG. 3, the device 110 comprises elements analogous to those of FIGS. 1 and 2, the same elements being denoted by the same reference numerals increased by 100.

The mould 112 here has a generally U-shaped transverse cross-section, and the impermeable membrane 124 forming the counter-mould comprises a central portion 124a having a U-shaped cross-section and two lateral portions 124b and 124c which come to rest on the edges of the mould 112. The mould 112 and the impermeable membrane 124 thus together delimit a moulding cavity having a U-shaped cross-section in order to allow a part having a U-shaped cross-section to be produced, which will be described hereinbelow.

Here, the mould 112 and the membrane 124 are not deformable and form a rigid frame, which allows a moulding process of constant volume to be carried out.

The fibre reinforcement 114 likewise has a generally U-shaped cross-section, as does the permeable membrane 116. Furthermore, a drainage fabric 128 is positioned above the permeable membrane 116 and beneath the central portion 124a of the impermeable membrane 124.

The injection conduit 132 passes in a tight manner through the portion 124b, while the aspiration conduit 134 opens into the central portion 124a.

The device 110 of FIG. 3 allows a part 38 (infiltrated preform) of generally U-shaped cross-section to be produced, as shown in FIG. 4. This part can have large dimensions, for example a length of one or more metres. It is obvious that other shapes are possible.

FIG. 5 shows a detail of the part 38 with its fibre reinforcement 14 composed of fibres 40 arranged in an orthogonal 3D lattice.

FIG. 6 shows a detail with the fibres 40 and the particles 42 of the matrix, for example alumina particles. It will be seen that the particles 42 have a diameter which is markedly smaller than the size of the voids between the fibres. Here, that diameter is from 5 to 10 times smaller than the size of the voids.

The invention will be described more particularly with reference to the following examples.

EXAMPLE 1

Production of an Alumina/Alumina Composite by a Process of Infiltration of a Suspension into a Fibre Reinforcement of Variable Volume An aqueous suspension composed of 2500 g of submicron alumina to one litre of water at pH 1 is prepared. A PVA (polyvinyl alcohol) binder is added at a rate of 6% by mass of the alumina, and the suspension is homogenized for three hours by grinding in a jar. A Nextel® 610 fibre reinforcement of 3D structure is placed on a flat support forming the mould bottom (mould 12 of FIG. 1). There are positioned on top: a release fabric 22 which acts as a drainage fabric, a membrane 16 permeable to gases and/or to liquids, a drainage fabric 28 and an impermeable membrane 24 (see FIG. 1).

A vacuum V is created between the permeable membrane 16 and the impermeable membrane 24, in the second cavity 26, which induces a vacuum in the first cavity 20 and, consequently, in the fibre reinforcement 14. The suspension S is then infused by means of low pressure into the fibre reinforcement through the injection conduit 32.

The whole is then heated to approximately 100° C. in order to evaporate the water from the matrix completely and remove it through the permeable membrane 16 and then the aspiration conduit 34. A composite product is obtained, which is subsequently removed from the mould and then sintered at a temperature of from 1100° C. to 1200° C.

During removal from the mould, the release fabric or drainage fabric 22 facilitates separation of the moulded product on the one hand and of the membranes 16 and 24 forming the counter-mould on the other hand.

EXAMPLE 2

Production of an Aluminosilicate/Alumina Composite by a Process of Infiltration of a Suspension into a Fibre Reinforcement of Constant Volume An aqueous suspension composed of 4000 grams of submicron alumina to one litre of water at pH 1 is prepared. The suspension is then homogenized for three hours by grinding in a jar.

A fibre reinforcement of Nextel® 720 (fibre fabric composed of 85% alumina and 15% silica) is used. The plies of the fabric are placed in a U-shaped mould (FIG. 3), the rigid frame of which fixes the fibre content by volume.

There are placed on top, according to FIG. 3: a membrane 116 permeable to gases and/or to liquids, a drainage fabric 128 and the membrane 124 forming the counter-mould.

The vacuum is created between the permeable membrane and the rigid counter-mould, which induces the vacuum in the plies of the fibre reinforcement 114. The suspension is infiltrated under vacuum with a pressure of 6.5 bar applied to the suspension (injection pressure) in order to assist the impregnation. The mould is heated at approximately 100° C. in order to evaporate the water from the matrix completely and remove it through the gas-permeable membrane and through the aspiration conduit 134.

There is thus obtained a preform analogous to the preform 38 of FIG. 4, which is subsequently removed from the mould and sintered at 1200° C. The final fibre content by volume is approximately 50% and the void ratio approximately 25%.

The process of the invention accordingly permits the production of ceramic matrix composite parts of large size and of complex shape with a controlled fibre content by volume which can reach 60%.

The invention is preferably used in the production of parts in the aeronautics and aerospace field.

The invention claimed is:

1. A process for producing a ceramic matrix composite part by injection of a suspension of a ceramic powder into a fibre reinforcement which has not been pre-impregnated, the method comprising:
   a) preparing a suspension of ceramic powder containing particles of chosen particle sizes dispersed in at least one solvent, in which the ceramic powder contains particles having a diameter which is from 5 to 10 times smaller than an average size of voids delimited by fibres of which the fibre reinforcement is composed, and in which the suspension has a loading rate of particles sufficient that only a single injection step is required to obtain a desired density of the ceramic matrix composite;
   b) positioning the fibre reinforcement in a mould;
   c) positioning on the fibre reinforcement a permeable membrane of chosen permeability that is permeable to gases and/or to liquids and impermeable to the particles, thus allowing a first cavity containing the fibre reinforcement to be closed;
   d) positioning an impermeable membrane, which forms a counter-mould, thus allowing a second, tight cavity which is next to the first cavity and contains the first cavity to be closed;
   e) establishing a vacuum between the impermeable membrane and the permeable membrane, in the second cavity, so as to create the vacuum in the first cavity;
   f) injecting, into said first cavity, beneath the permeable membrane, the suspension of ceramic powder of step a) into the fibre reinforcement, by means of a difference of pressure, the injection being carried out in a single injection step;
   g) removing the solvent through the permeable membrane in order to obtain an impregnated fiber reinforcement;
   h) removing the impregnated fiber reinforcement obtained in step g) from the mould; and
   i) sintering the impregnated fiber reinforcement obtained in step h).

2. The process according to claim 1, in which the suspension (S) of ceramic powder prepared in step a) comprises at least one ceramic powder, at least one solvent and at least one ceramic precursor.

3. The process according to claim 2, in which the suspension of ceramic powder prepared in step a) comprises at least one ceramic precursor.

4. The process according to claim 3, wherein the at least one ceramic precursor comprises zirconia, mullite, alumina, silica or a mixture thereof.

5. The process according to claim 1, in which the particles of the ceramic powder are of at least two different particle sizes, comprising particle diameters which are from 5 to 10 times smaller than the size of the voids between the fibres of the fibre reinforcements and particle diameters which are from 50 to 100 times smaller than the size of the voids between the fibres of the fibre reinforcements.

6. The process according to claim 1, in which the suspension of ceramic powder prepared in step a) further comprises a binder and/or a plasticiser and/or a wetting agent and/or an antifoam.

7. The process according to claim 1, further comprising a step of de-sizing the fibre reinforcement positioned in step b), the de-sizing step being carried out before and/or during the injection step f), by thermal or chemical action.

8. The process according to claim 7, wherein the de-sizing is carried out by dissolving a size in the solvent.

9. The process according to claim 1, in which an interphase is deposited on the fibre reinforcement prior to the injection step f).

10. The process according to claim 9, wherein the interphase comprises carbon or boron nitrite.

11. The process according to claim 1, in which the fiber reinforcement is covered completely in the permeable membrane and then the impermeable membrane, which allows gases and liquids to be removed from the fiber reinforcement.

12. The process according to claim 1, in which: step g) effects the removal of the solvent by aspiration into the second cavity and/or by heating.

13. The process according to claim 1, in which the mould and the impermeable membrane form a rigid counter-mould and together delimit a moulding cavity of fixed volume.

14. The process according to claim 1, in which the mould and the impermeable membrane form a flexible or semi-rigid counter-mould and together delimit a moulding cavity of variable volume.

* * * * *